(12) United States Patent
Liu et al.

(10) Patent No.: US 8,315,600 B2
(45) Date of Patent: Nov. 20, 2012

(54) METHOD AND DEVICE FOR SETTING USER-SIDE WHITE LIST AND PAGING USER EQUIPMENT

(75) Inventors: Hai Liu, Shenzhen (CN); Peng Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/071,285

(22) Filed: Mar. 24, 2011

(65) Prior Publication Data

US 2011/0171933 A1     Jul. 14, 2011

Related U.S. Application Data

(63) Continuation of application No. PCT/CN2009/073824, filed on Sep. 9, 2009.

(30) Foreign Application Priority Data

Sep. 26, 2008   (CN) .......................... 2008 1 0168317

(51) Int. Cl.
*H04M 3/16*     (2006.01)
(52) U.S. Cl. .................... 455/411; 455/434; 455/458
(58) Field of Classification Search .................. None
See application file for complete search history.

(56) References Cited

U.S. PATENT DOCUMENTS

| 6,628,937 | B1 | 9/2003 | Salin |
| 2009/0083403 | A1 | 3/2009 | Xu et al. |
| 2009/0305699 | A1* | 12/2009 | Deshpande et al. ........ 455/434 |
| 2010/0075670 | A1* | 3/2010 | Wu .............................. 455/434 |

FOREIGN PATENT DOCUMENTS

| CN | 1270747 A | 10/2000 |
| CN | 1173597 C | 10/2004 |
| CN | 101083549 A | 12/2007 |
| CN | 101217709 A | 7/2008 |

OTHER PUBLICATIONS

Written Opinion of the International Searching Authority issued in corresponding PCT Patent Application No. PCT/CN2009/073824, mailed Dec. 17, 2009.
International Search Report issued in corresponding PCT Patent Application No. PCT/CN2009/073824, mailed Dec. 17, 2009.
Office Action issued in corresponding Chinese Patent Application No. 200810168317.0, mailed Aug. 23, 2011.
Office Action issued in corresponding Chinese Patent Application No. 200810168317.0, mailed May 14, 2012.

* cited by examiner

*Primary Examiner* — Erika A Washington
(74) *Attorney, Agent, or Firm* — Brinks Hofer Gilson & Lione

(57) ABSTRACT

The present invention discloses methods and devices for setting user-side white list and paging UE, and relates to the field of communication. To solve the problem that the user-side white list is inconsistent with the network-side white list, the method for setting a user-side white list includes: Acquiring and storing information of CSG to be deleted from a user-side white list; receiving a second NAS message originated from a UE; and sending the UE a response message of the second NAS message, so that the UE deletes CSG specified by the information of the CSG from the user-side white list. To solve the problem that the MME may fail to pages the UE through the network-side white list when the user-side white list is inconsistent with the network-side white list, the method for paging UE includes: acquiring and storing information of CSG to be deleted from a user-side white list; and sending a UE paging message to CSG specified by the information of the CSG. The embodiments of the present invention can be applied to a mobile network accessed through an HeNB.

16 Claims, 4 Drawing Sheets

METHOD AND DEVICE FOR SETTING USER-SIDE WHITE LIST AND PAGING USER EQUIPMENT

CROSS-REFERENCE TO RELATED APPLICATIONS

This application is a continuation of International Application No. PCT/CN2009/073824, filed on Sep. 9, 2009, which claims priority to Chinese Patent Application No. 200810168317.0, filed on Sep. 26, 2008, both of which are hereby incorporated by reference in their entireties.

FIELD OF THE INVENTION

The present invention relates to the communications field, and particularly, to method, device and system for setting user-side white list, as well as method and device for paging user equipment.

BACKGROUND OF THE INVENTION

The Home NodeB (HeNB) is a user-side access equipment arranged in the house or office. It can access a mobile communication network through the Internet, so that the user indoors obtains a quality of radio communication service that has a wider bandwidth and higher reliability than that outdoors, and thus the bottleneck problem of radio data service air interface resource is solved.

One or more HeNBs can constitute a Closed Subscriber Group (CSG), and each CSG allows only certain User Equipment (UE) to access. The user-side white list is used to store a list of CSGs allowing the user to access, and when the UE wants to access the mobile communication network through the HeNB, it may first search for the CSG in the user-side white list, and then access the mobile communication network through certain HeNB of the CSG. After the UE accesses the mobile communication network, a network-side Mobility Management Entity (MME) can search a network-side white list to acquire information of a CSG that allows the UE to access, and pages the UE by sending a paging message to the CSG Currently, the process of setting a user-side white list is initiated by a UE. The process includes: The UE initiates through the CSG a Non Access Stratum (NAS) message that includes attach message, service request, message about tracking area update, and detach message, receives a response message returned by the MME, and sets a user-side white list according to the response message. That is, the UE deletes the CSG from the user-side white list when the MME returns a rejection message, and the UE adds the CSG to the user-side white list when the MME returns an acceptance message.

The prior art has at least the following problems:

When the MME does not respond to the NAS message initiated by the UE through the CSG, the UE cannot know whether or not to delete the CSG from the user-side white list, and hence cannot set the user-side white list. Therefore, the user-side white list may be inconsistent with the network-side white list.

When the user-side white list is inconsistent with the network-side white list (for example, certain CSG included in the user-side white list is not in the network-side white list), the CSG accessed by the UE may be not included in the network-side white list. In such a case, the MME cannot page the UE according to the network-side white list.

SUMMARY OF THE INVENTION

The embodiments of the present invention provide a method and device for setting user-side white list, so that a user-side white list is consistent with a network-side white list.

To achieve the above object, the embodiments of the present invention adopt the following technical solutions:

A method for setting a user-side white list, including: acquiring and storing information of CSG to be deleted from a user-side white list; receiving a second NAS message originated from a UE; and sending the UE a response message of the second NAS message, so that the UE deletes a CSG specified by the information of the CSG from the user-side white list.

An MME, including: a CSG information storing unit configured to acquire and store the information of the CSG to be deleted from a user-side white list; a second NAS message receiving unit configured to receive a second NAS message originated from a UE; and a response message sending unit configured to send the UE a response message of the second NAS message, so that the UE deletes a CSG specified by the information of the CSG from the user-side white list.

In the method and device for setting user-side white list provided by the embodiment of the present invention, the MME acquires and stores the information of the CSG to be deleted from a user-side white list. Thus, when the UE sends a second NAS message to the MME, the MME sends a response message to the UE so that the information of the CSG to be deleted from the user-side white list is sent to the UE. Then, the UE deletes a CSG specified by the information of the CSG from the user-side white list, to achieve the object of setting a user-side white list. Meanwhile, the following problem in the prior art may be solved: Because the UE initiates a NAS message through a CSG and sets the user-side white list according to the response message returned by the MME, the user-side white list cannot be set when the MME does not send a response message. Because the UE can acquire the information of the CSG to be deleted from the user-side white list from a subsequent response message of the second NAS message and set the user-side white list according to the information of the CSG, the user-side white list is consistent with the network-side white list. This can solve the problem in the prior art that the user-side white list may be inconsistent with the network-side white list when the UE cannot set the user-side white list.

The embodiment of the present invention further provides a method and device for paging a UE, which can successfully page the UE when a user-side white list is inconsistent with a network-side white list.

A method for paging a UE, including: acquiring and storing information of CSG to be deleted from a user-side white list; and sending a UE paging message to a CSG specified by the information of the CSG.

An MME, including: a CSG information storing unit configured to acquire and store information of CSG to be deleted from a user-side white list; and a paging unit configured to send a UE paging message to a CSG specified by the information of the CSG.

In the method and device for paging a UE provided by the embodiments of the present invention, when a user-side white list is inconsistent with a network-side white list, the MME may send a paging message to an acquired CSG that needs to be deleted from the user-side white list, so as to ensure a successful paging of the UE. Thus, the following problem in the prior art may be solved: The MME pages the UE among only the CSGs included in a network-side white list and the paging may fail in case the user-side white list is inconsistent with a network-side white list.

BRIEF DESCRIPTION OF THE DRAWINGS

To more clearly describe the embodiments of the present invention or the technical solution of the prior art, the drawings to be used in the descriptions of the embodiments or the prior art are briefly introduced as follows. Apparently, the drawings described as follows are just some embodiments of the present invention, and a person skilled in the art can obtain other drawings based on those drawings without paying any creative effort.

DETAILED DESCRIPTION OF THE EMBODIMENTS

The technical solutions of the embodiments of the present invention are clearly and completely described in conjunction with the drawings. Apparently, the described embodiments are partial embodiments of the present invention, instead of all the embodiments. Any other embodiment acquired by a person skilled in the art based on the embodiments of the present invention without paying any creative effort, shall fall within the protection scope of the present invention.

In the prior art, when the MME does not respond to the NAS message initiated by the UE through the CSG, e.g., the UE initiates a detach message from the CSG and simultaneously instructs to power off but the MME does not send a detach response message to the UE, the UE cannot acquire the information about whether or not to delete the CSG from the user-side white list, and hence cannot set the user-side white list. To solve the above problem, the embodiments of the present invention provide a method and device for setting a user-side white list, which are described in detail as follows with embodiments and drawings.

Figure 1:
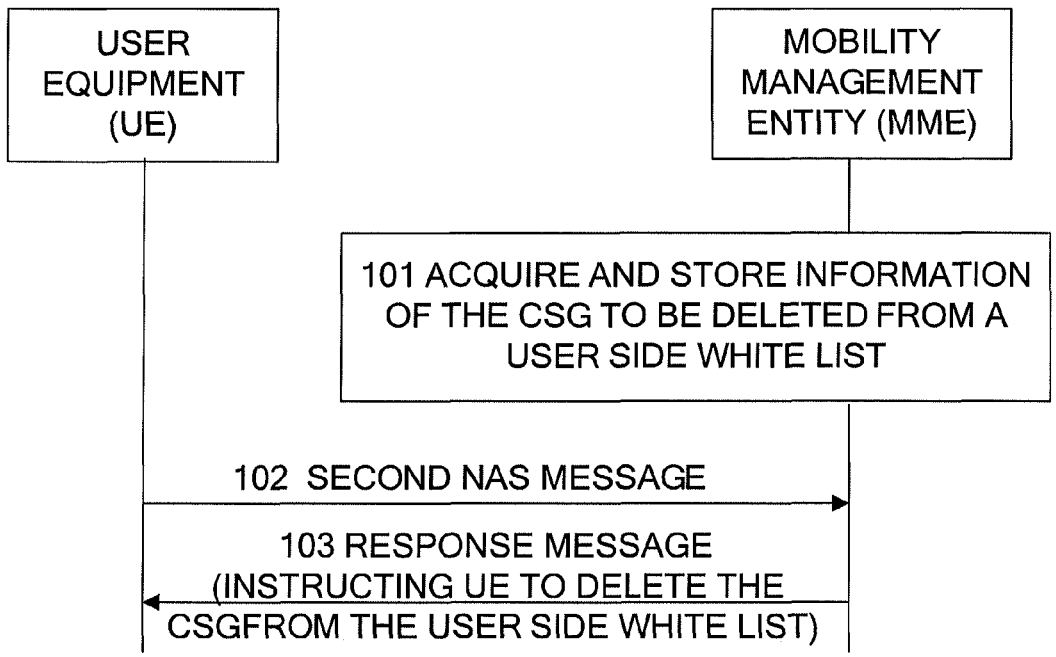
FIG. 1 is a sequence chart of a method for setting a user-side white list provided by an embodiment of the present invention.

As shown in FIG. 1, a method for setting a user-side white list is provided by an embodiment of the present invention, including:

Step 101: An MME acquires and stores Information of CSG to be deleted from a user-side white list;

Step 102: The MME receives a second NAS message sent by a UE, and the second NAS message may be attach, service request, tracking area update, detach, etc.

Step 103: The MME sends the UE a response message of the second NAS message, so that the UE deletes a CSG specified by the information of the CSG to be deleted from the user-side white list, from the user-side white list according to the response message.

In the present embodiment, step 103 concretely may be as follows: When the MME judges that the second NAS message is sent by the UE through the CSG to be deleted, the MME sends a rejection message (e.g., attach reject, tau reject, or service request reject) to the UE, and the UE deletes the CSG from the user-side white list according to the rejection message; when the MME judges that the second NAS message is not sent by the UE through the CSG to be deleted, the MME carries the CSG information (e.g., CSG ID) to be deleted from the user-side white list into a response message sent to the UE, and the UE deletes a CSG from the user-side white list according to the CSG information. Of course, in the practical process, when the second NAS message is sent by the UE through the CSG to be deleted, the rejection message sent by the MME to the UE may also carry information of other CSG to be deleted from the user-side white list, and the UE can delete the CSG indicated by the CSG information carried in the rejection message according to the rejection message, and herein is not described in detail.

Figure 2:
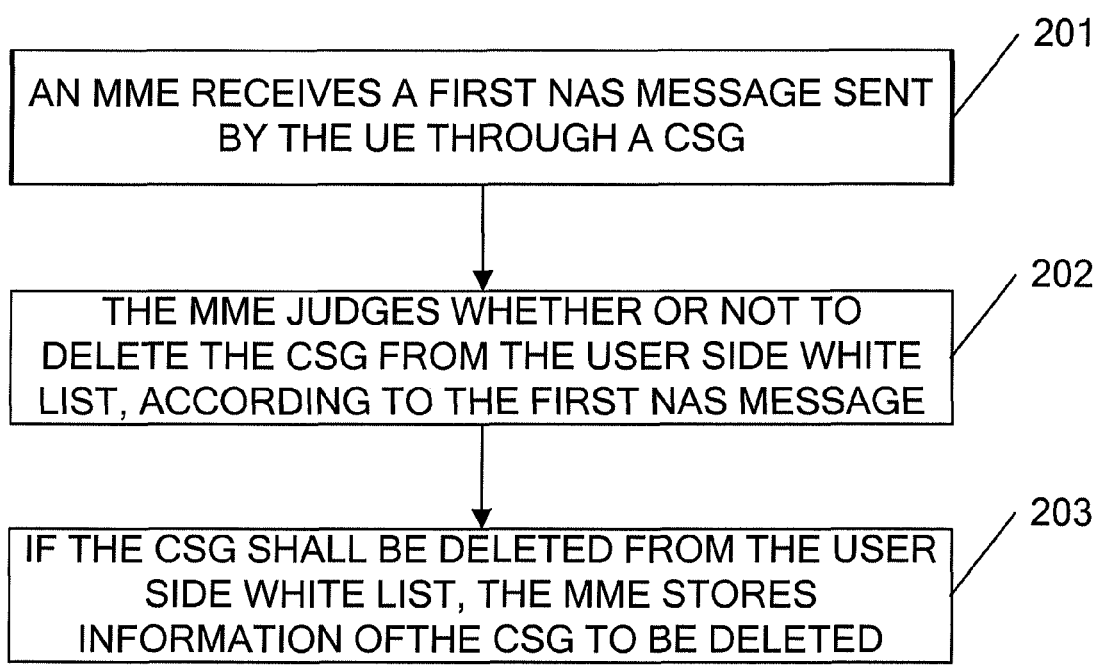
FIG. 2 is a flowchart of step 101 of the method for setting a user-side white list provided by the embodiment of the present invention.

In another embodiment provided by the present invention, step 101 as shown in FIG. 1 can be implemented in different methods, for example:

One method is that an MME acquires information of CSG to be deleted from a user-side white list according to a message (e.g., detach) sent by a UE and stores the information. As shown in FIG. 2, the method includes of the following steps:

Step 201: The MME receives a first NAS message sent by the UE through a CSG;

Step 202: The MME judges whether or not to delete the CSG from the user-side white list, according to the first NAS message;

Step 203: If the CSG needs to be deleted from the user-side white list, the MME stores information of the CSG to be deleted.

Another method is that the information of the CSG to be deleted from a user-side white list is acquired from a Home Subscriber Server (HSS), and the CSG information is stored.

In the above two embodiments, the information of the CSG to be deleted from the user-side white list may be stored in a certain period, that is, a storage period. The storage period generally is the same as a context lifetime of the UE. In still another embodiment of the invention, when the storage period of the information of the CSG to be deleted from the user-side white list is overtime, the method for setting a user-side white list provided by the embodiment of the present invention may further include a step in which the MME sends the information of the CSG to be deleted from the user-side white list to other MME, or a step in which the MME discards the information of the CSG to be deleted from the user-side white list.

Figure 3:
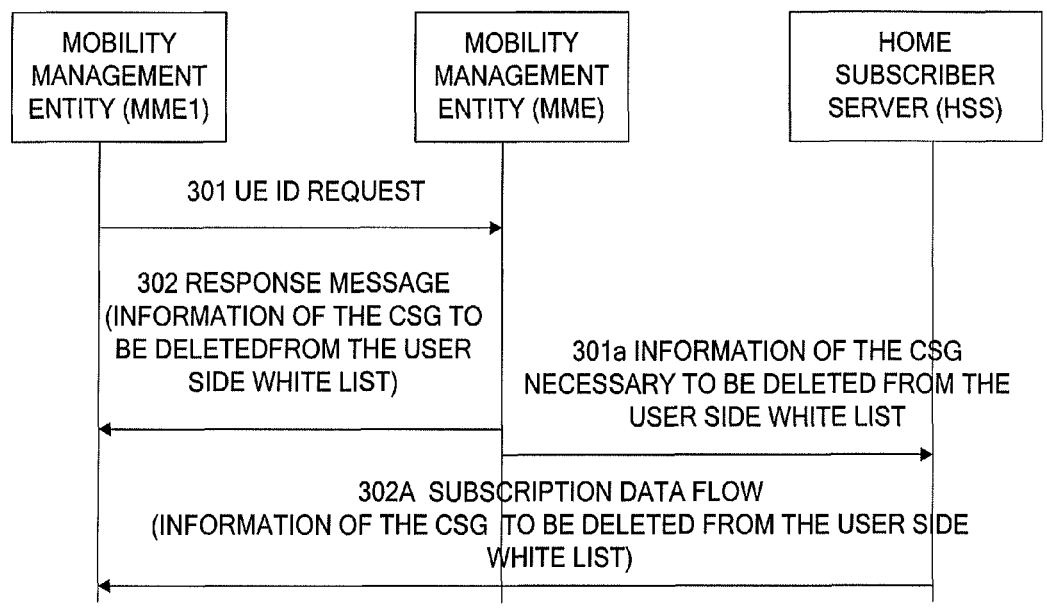
FIG. 3 is a sequence chart of sending Information of CSG to be deleted to other MME when the storage period of the CSG information is overtime, in the method for setting a user-side white list provided by the embodiment of the present invention.

As shown in FIG. 3, in the present embodiment, the step in which the MME sends other MME (MME1 as shown in FIG. 3) the information of the CSG to be deleted from the user-side white list may concretely include:

Step 301: The MME receives a UE ID request sent by the MME1;

Step 302: The MME sends the MME1 a response message carrying the information of the CSG to be deleted from the user-side white list;

Or, as shown in FIG. 3, the step in which the MME sends the MME1 the information of the CSG to be deleted from the user-side white list may concretely include:

Step 301a: The MME sends an HSS the information of the CSG to be deleted from the user-side white list;

Step 302a: The HSS sends the MME1 the information of the CSG to be deleted from the user-side white list, by an Insert Subscriber Data process.

In the method for setting a user-side white list provided by the embodiment of the present invention, the MME acquires the information of the CSG to be deleted from the user-side white list and stores the CSG information. Thus, when the UE sends a second NAS message to the MME subsequently, the MME sends a response message to the UE, so that the UE deletes a CSG specified by the information of the CSG. from the user-side white list according to the response message. This is to achieve the object of setting user-side white list. The following problem in the prior art may be solved: Because the UE initiates a NAS message from the CSG and sets the user-side white list according to the response message returned by the MME, the user-side white list cannot be set when the MME does not send a response message. Since the UE can acquire the information of the CSG to be deleted from the user-side white list from a subsequent response message of the second NAS message and set the user-side white list according to the CSG information, the user-side white list is consistent with the network-side white list, so as to solve the problem in the prior art that the user-side white list may be inconsistent with the network-side white list when the UE cannot set the user-side white list.

Figure 4:
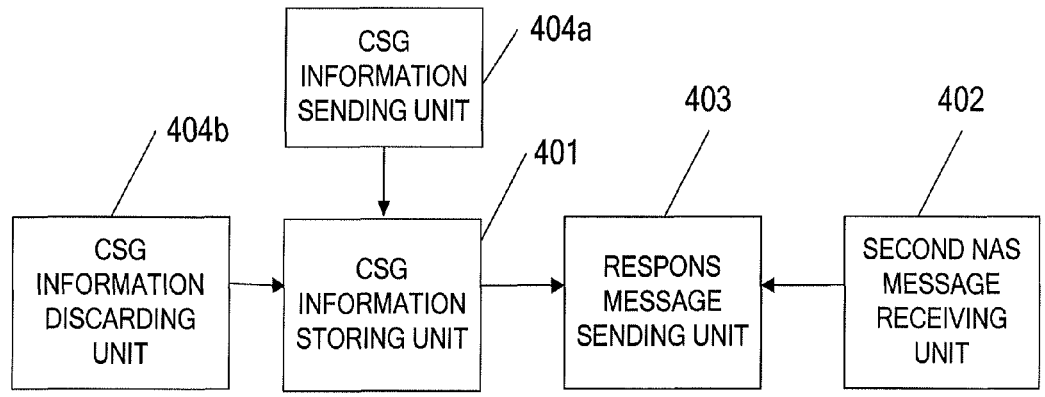
FIG. 4 is a schematic structure diagram of an MME provided by an embodiment of the present invention.

In correspondence to the above method for setting a user-side white list, as shown in FIG. 4, the embodiment of the invention further provides an MME, including:

a CSG information storing unit 401 configured to acquire and store information of CSG to be deleted from a user-side white list;

a second NAS message receiving unit 402 configured to receive a second NAS message originated from a UE; and a response message sending unit 403 configured to send the UE a response message of the second NAS message, so that the UE deletes a CSG specified by the information of the CSG. from the user-side white list according to the response message.

Figure 5:
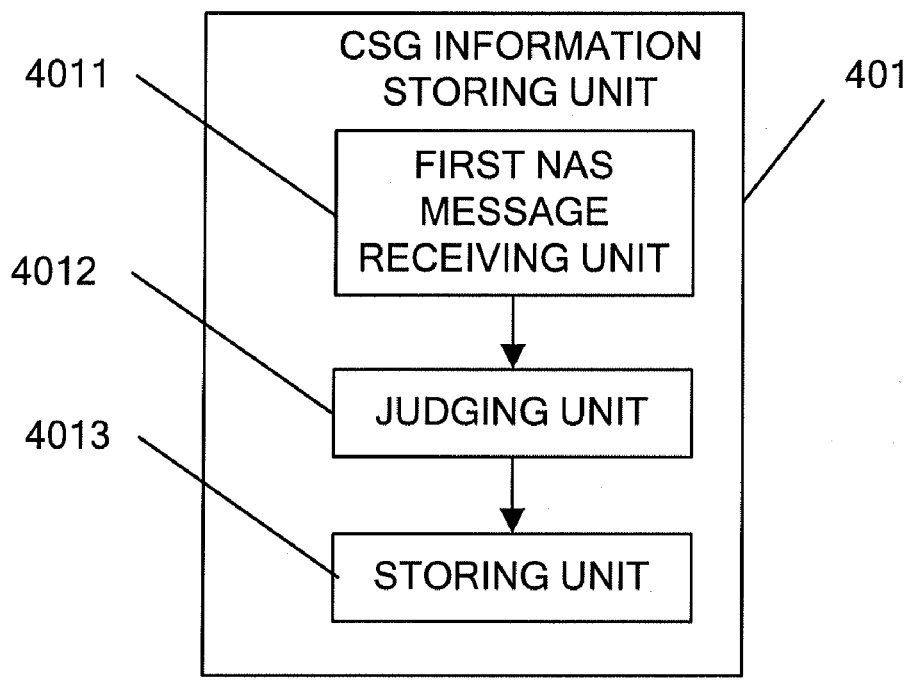
FIG. 5 is a schematic structure diagram of a CSG information storing unit of the MMS provided by the embodiment of the present invention as illustrated in FIG. 4.

Further, as shown in FIG. 5, the CSG information storing unit 401 may include:

a first NAS message receiving unit 4011 configured to receive a first NAS message sent by the UE through a CSG;

a judging unit 4012 configured to judge whether or not to delete the CSG from the user-side white list according to the first NAS message; and a storing unit 4013 configured to store the information of the CSG to be deleted when the CSG needs to be deleted from the user-side white list.

Further, as shown in FIG. 4, the MME may further include:

a CSG information sending unit 404a configured to send other MME the information of the CSG to be deleted from the user-side white list when the storage period of the information of the CSG to be deleted from the user-side white list is overtime; or a CSG information discarding unit 404b configured to discard the information of the CSG to be deleted from the user-side white list when the storage period of the information of the CSG to be deleted from the user-side white list is overtime.

Figure 6:
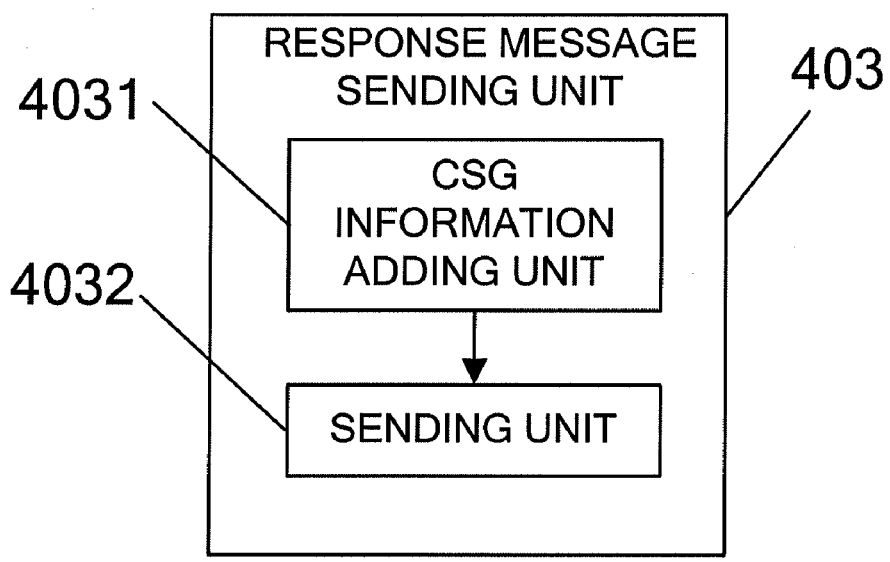
FIG. 6 is a schematic structure diagram of a response message sending unit of the MMS provided by the embodiment of the present invention as illustrated in FIG. 4.

Further, as shown in FIG. 6, the response message sending unit 403 may include:

a CSG information adding unit 4031 configured to add the information of the CSG to be deleted from the user-side white list to the response message of the second NAS message; and a sending unit 4032 configured to send the UE a response message carrying the information of the CSG to be deleted from the user-side white list.

The MME provided by the embodiment of the present invention acquires the information of the CSG to be deleted from the user-side white list and stores the CSG information. Thus, when the UE sends a NAS message to the MME subsequently, the MME sends a response message of the second NAS message to the UE so that the UE deletes a CSG specified by the information of the CSG. from the user-side white list according to the response message. This is to achieve the object of setting user-side white list. The following problem in the prior art may be solved: Because the UE initiates a NAS message through the CSG and sets the user-side white list according to the response message returned by the MME, the user-side white list cannot be set when the MME does not send a response message. Because the UE can acquire the information of the CSG to be deleted from the user-side white list from a subsequent response message of the NAS message sent by the MME and set the user-side white list according to the CSG information, the user-side white list is consistent with the network-side white list. Thus, the following problem in the prior art is solved: The user-side white list may be inconsistent with the network-side white list when the UE cannot set the user-side white list.

Figure 7:
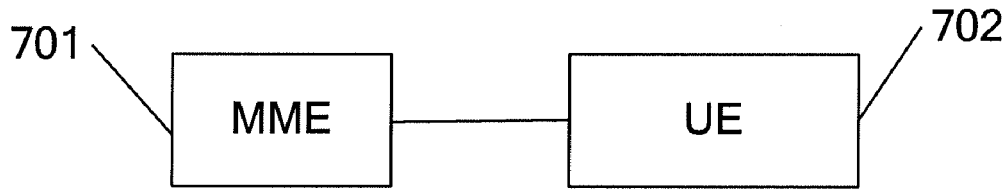
FIG. 7 is a schematic structure diagram of a system for setting user-side white list provided by an embodiment of the present invention.

As shown in FIG. 7, the embodiment of the present invention further provides a system for setting user-side white list, including:

an MME 701 configured to acquire and store information of CSG to be deleted from the user-side white list, receiving a second NAS message sent by a UE 702, send the UE 702 a response message of the second NAS message, and designate the UE 702 to delete the CSG from the user-side white list; and the UE 702 configured to send the second NAS message to the MME 701, receive the response message sent by the MME 701, and delete the CSG designated by the response message.

The UE 702 is further configured to send the MME 701 a first NAS message through a CSG; and the MME 701 is further configured to receive the first NAS message, judge whether or not to delete the CSG from the user-side white list according to the message, and store information of the CSG to be deleted from the user-side white list when the CSG needs to be deleted from the user-side white list.

In the system for setting a user-side white list provided by an embodiment of the present invention, the MME can acquire information of CSG to be deleted from the user-side white list and store the CSG information. When the UE sends a second NAS message to the MME subsequently, the MME sends a response message to the UE, so that the UE can delete a CSG specified by the information of the CSG. from the user-side white list according to the response message, so as to achieve the object of setting user-side white list. The following problem in the prior art may be solved: Because the UE initiates a NAS message through the CSG and sets the user-side white list according to the response message returned by the MME, the user-side white list cannot be set when the MME does not send a response message. Because the UE can acquire the information of the CSG to be deleted from the user-side white list from a subsequent response message of the second NAS message and set the user-side white list according to the CSG information, the user-side white list is consistent with the network-side white list. Thus, the following problem in the prior art is solved: The user-side white list may be inconsistent with the network-side white list when the UE cannot set the user-side white list.

To solve the problem in the prior art that the MME may fail to pages the UE through the network-side white list when the user-side white list is inconsistent with the network-side white list, the embodiments of the present invention provide a method and device for paging a UE, which are described in detail as follows through embodiments and drawings.

Figure 8:
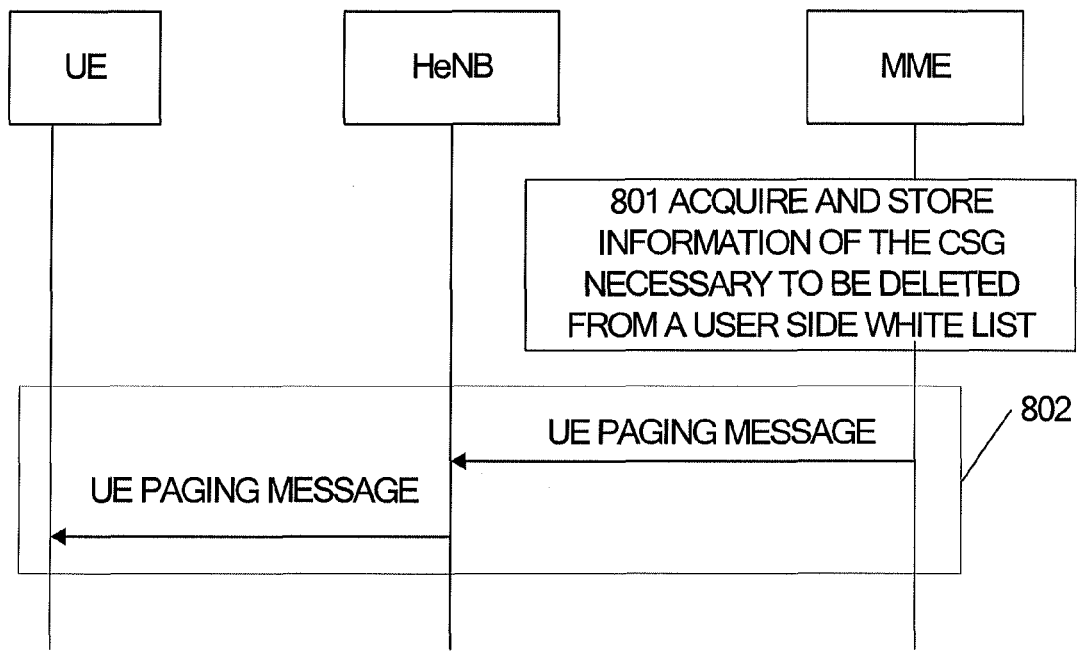
FIG. 8 is a sequence chart of a method for paging UE provided by an embodiment of the present invention.

As shown in FIG. 8, a method for paging UE is provided by an embodiment of the present invention, including:

Step 801: An MME acquires and stores information of CSG to be deleted from a user-side white list;

In the present embodiment, the method by using which the MME acquires the information of the CSG to be deleted from the user-side white list may include: receiving a NAS message sent by the UE, judging whether a CSG where the UE exists is not in the network-side white list according to the NAS message, and determining that the CSG needs to be deleted from the user-side white list according to the judging result; or acquiring the information of the CSG to be deleted from the user-side white list from an Insert User Subscription Data message sent by the HSS. Of course, in the practical implementation, the MME may also acquire the information of the CSG to be deleted from the user-side white list in other way, and herein is not described in detail.

Step 802: The MME sends a UE paging message to the CSG specified by the information of the CSG The step may concretely include: The MME sends the UE paging message to one or more of the HeNBs in the CSG, and the HeNBs page the UE according to the paging message.

The MME sending the UE paging message to the CSG may include: the MME directly sends the UE paging message to the HeNBs directly, or the MME firstly sends the UE paging message to a gateway entity of the HeNBs, and then the gateway entity sends the UE paging message to the HeNBs.

Optionally, the present embodiment may further include: If the MME determines that the information of the CSG to be deleted from the user-side white list has been deleted by the UE, the step of paging the UE on the CSG deleted from the user-side white list needs to be stopped.

Concretely, the method by using which the MME determines that the information of the CSG to be deleted from the user-side white list has been deleted by the UE may include:

When the UE sends the MME a NAS message through a CSG specified by the information of the CSG. in a subsequent flow, e.g., when the UE sends the MME a message such as service request/TAU/detach message, the MME may send a rejection message to the UE, and instruct the UE to delete the CSG from the user-side white list, and after sending the rejection message, the MME determines that the information of the CSG to be deleted from the user-side white list has been deleted by the UE; or the MME receives a notification, sent from a white list server, which notifies that the deletion has been completed, and then determines, according to the notification, that the information of the CSG to be deleted from the user-side white list has been deleted by the UE.

In another embodiment of the present invention, when the MME acquires and stores the information of the CSG to be deleted from the user-side white list, the method may further include a step of carrying out paging timing for the CSG. Under such condition, when the MME wants to page the UE, it may send the paging message on the CSG to be deleted, as described in step 802 of previous embodiment. In this process, the UE may be notified by other white list server to delete the CSG from the user-side white list. When the UE successfully deletes the CSG from the user-side white list, the MME may page the UE according to the network-side white list. When the paging timing is reached, the MME may determine that other server has notified the UE to delete the CSG to be deleted from the user-side white list, and then stops paging on the CSG.

In the method for paging UE provided by the embodiment of the present invention, when the user-side white list is inconsistent with the network-side white list, the MME may send a paging message to the acquired CSG to be deleted from the user-side white list, so as to ensure a successful paging of the UE. This solves the problem in the prior art that the MME pages the UE among only the CSGs included in the network-side white list and the paging may fail in case the user-side white list is inconsistent with the network-side white list, and solves the problem that the user-side white list is inconsistent with the network-side white list. Therefore, the MME can use the technical solution of the prior art to page the UE.

Figure 9:
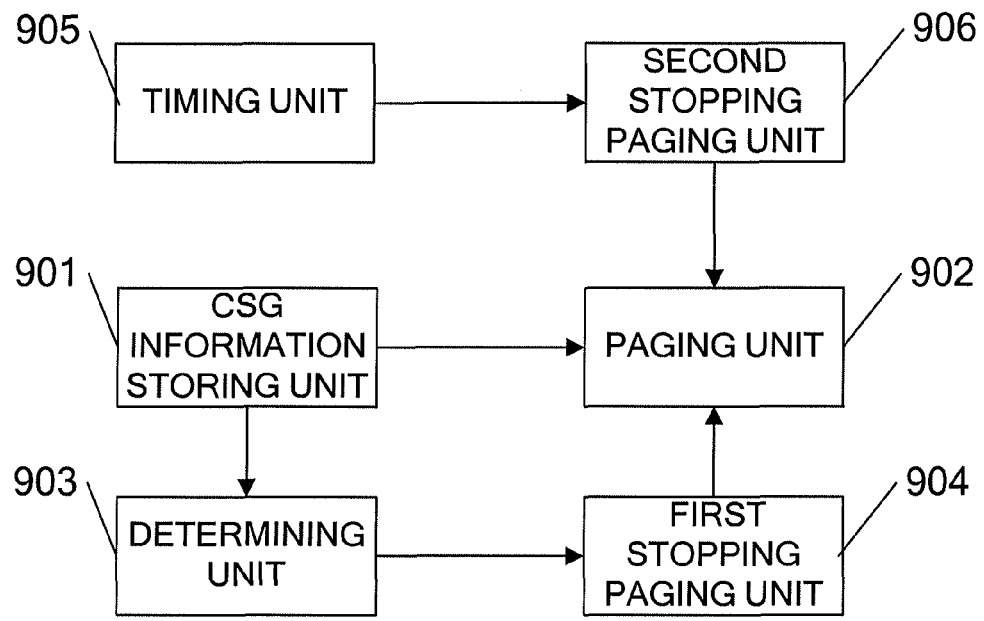
FIG. 9 is a schematic diagram of the structure of an MME provided by an embodiment of the present invention.

In correspondence to the above method for paging UE provided by the embodiment of the present invention of FIG. 8, as shown in FIG. 9, the embodiment of the invention further provides an MME, including:

a CSG information storing unit 901 configured to acquire and store information of CSG to be deleted from a user-side white list; and a paging unit 902 configured to send a UE paging message to a CSG specified by the information of the CSG Further, the MME may include:

a determining unit 903 configured to determine that the information of the CSG to be deleted from the user-side white list and stored by the CSG information storing unit 901 has been deleted by the UE; and a first stopping paging unit 904 configured to stop the paging unit 902 from paging the UE on the CSG having been deleted from the user-side white list, according to a determining result by the determining unit 903.

Further, the MME may include:

a timer 905 configured to carry out a paging timing for a CSG specified by the information of the CSG; and a second stopping paging unit 906 configured to stop the paging unit 902 from sending the UE paging message to the CSG, when the paging timing is reached.

Please refer to the method for paging UE provided by the embodiment of the present invention for the method for implementing the MME provided by the embodiment of the present invention, and herein is not described in detail.

When the user-side white list may be inconsistent with the network-side white list, the MME provided by the embodiment of the present invention may send a paging message to the acquired CSG to be deleted from the user-side white list, so as to ensure a successful paging of the UE. This solves the problem in the prior art that the MME pages the UE among only the CSGs included in the network-side white list and the paging may fail in case the user-side white list is inconsistent with the network-side white list. When the inconsistence between the user-side white list and the network-side white list is removed, the MME can use the technical solution of the prior art to page the UE.

The methods and devices for setting user-side white list and paging UE can be applied to a mobile network accessed through HeNB.

A person skilled in the art will appreciate that all or partial steps of the methods in the above embodiments can be implemented by instructing related hardware with a program that may be stored in a computer readable storage medium, such as ROM/RAM, magnetic disk, optical disk, etc.

The above descriptions are just some embodiments of the present invention, and the protection scope of the present invention is not limited thereby. Within the technical range of the disclosure of the present invention, any change or substitution that can be easily conceived by a person skilled in the art shall be covered in the protection scope of the present invention. Therefore, the protection scope of the present invention shall be dependent on the claims.

What is claimed is:

1. A method for paging User Equipment (UE), comprising:
   acquiring from an insert user subscription data message sent from a home subscriber server (HSS), information of a Closed Subscriber Group (CSG) which is to be deleted from a user-side white list, wherein the user-side white list is configured to store a list of CSGs allowing a UE to access;
   storing the acquired information of the CSG to be deleted from the user-side white list; and
   sending a UE Paging Message to the CSG that is specified by the stored information for paging the UE.

2. The method according to claim 1, wherein the acquiring information of the CSG to be deleted from the user-side white list comprising:
   receiving a Non Access Stratum (NAS) message sent from the UE, judging that the CSG, through which the UE sent the NAS message, is not in a network-side white list according to the NAS message, and determining that the CSG, through which the UE sends the NAS message, is the CSG to be deleted from the user-side white list according to the judging result.

3. The method according to claim 1, further comprising:
   stopping paging the UE through the CSG specified by the stored information if it is determined that the CSG specified by the stored information has been deleted by the UE from the user-side white list.

4. The method according to claim 3, wherein,
   the determining that the CSG specified by the information has been deleted by the UE from the user-side white list comprising:
   receiving a non access stratum (NAS) message sent by the UE through the CSG specified by the stored information, sending a rejection message to the UE to instruct the UE to delete the CSG to be deleted from the user-side white list, and determining that the CSG specified by the stored information has been deleted by the UE from the user-side white list after sending the rejection message.

5. The method according to claim 3, wherein the CSG specified by the stored information having been deleted by the UE from the user-side white list is determined based on a notification received from a white list server, the notification indicating that a deletion of the CSG is complete.

6. The method according to claim 1, further comprising:
   carrying out a paging timing for the CSG to be deleted; and
   stopping sending the UE Paging Message to the CSG when the paging timing is expired.

7. A Mobility Management Entity (MME), comprising:
   a Closed Subscriber Group (CSG) information acquiring unit, configured to acquire, from an insert user subscription data message sent from a home subscriber server (HSS), information of a CSG to be deleted from a user-side white list, wherein the user-side white list is configured to store a list of CSGs allowing a user equipment (UE) to access;
   a CSG storing unit, configured to store the acquired information of the CSG that is to be deleted from the user-side white list; and
   a paging unit, configured to send a UE Paging Message to the CSG that is specified by the stored information, for paging the UE.

8. The MME according to claim 7, further comprising:
   a determining unit, configured to determine that the CSG specified by the stored information has been deleted by the UE from the user-side white list; and
   a stopping paging unit, configured to stop the paging unit from paging the UE through the CSG specified by the stored information, according to a determining result determined by the determining unit.

9. The MME according to claim 8, wherein,
   the determining unit further comprises:
   a first determining sub unit, configured to receive a non access stratum (NAS) message sent by the UE through the CSG specified by the stored information, and to send a rejection message to the UE to instruct the UE to delete the CSG to be deleted from the user-side white list, and determine that the CSG specified by the stored information has been deleted by the UE from the user-side white list after sending the rejection message; or
   a second determining sub unit configured to determine based on a notification receiving from a white list server, the notification indicating that a deletion of the CSG is complete.

10. The MME according to claim 7, further comprising:
    a timer, configured to carry out a paging timing for the CSG; and
    a stopping paging unit, configured to stop the paging unit from sending the UE paging message to the CSG corresponding to the stored information, when the timer is expired.

11. A method for setting a user-side white list, comprising:
    acquiring from an insertion data message sent from a home subscriber server (HSS), and storing information of a Closed Subscriber Group (CSG) to be deleted from a user-side white list;
    receiving a Non Access Stratum (NAS) message originated from a User Equipment (UE); and
    sending the UE a response message of the NAS message, so that the UE deletes the CSG to be deleted from the user-side white list according to the response message.

12. The method according to claim 11, wherein the acquiring and storing information of the CSG to be deleted from a user-side white list comprising:
    receiving the NAS message sent by the UE through the CSG to be deleted;
    judging whether the CSG to be deleted needs to be deleted from the user-side white list, according to the first NAS message; and
    storing information of the CSG to be deleted from the user-side white list when judging that the CSG needs to be deleted from the user-side white list.

13. The method according to claim 11, wherein a storage period of the information of the CSG to be deleted from the user-side white list is same as a context lifetime of the UE.

14. The method according to claim 13, wherein when the storage period of the information of the CSG to be deleted from the user-side white list is overtime, the method further comprises:
    sending to another MME the information of the CSG to be deleted from the user-side white list; or
    discarding the information of the CSG to be deleted from the user-side white list.

15. The method according to claim 14, wherein sending to another MME the information of the CSG to be deleted from the user-side white list comprising:

sending to the another MME a response message carrying the information of the CSG to be deleted from the user-side white list in response to a UE ID request received from the another MME; or sending to the another MME the information of the CSG to be deleted from the user-side white list through the HSS.

16. The method according to claim 11, wherein the response message of the NAS message carries the information of the CSG to be deleted from the user-side white list.

* * * * *